(12) United States Patent
Bando

(10) Patent No.: US 7,860,336 B2
(45) Date of Patent: Dec. 28, 2010

(54) IMAGE CONVERSION DEVICE, IMAGE CONVERSION METHOD, AND RECORDING MEDIUM

(75) Inventor: Yosuke Bando, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1035 days.

(21) Appl. No.: 11/595,491

(22) Filed: Nov. 10, 2006

(65) Prior Publication Data

US 2007/0172141 A1      Jul. 26, 2007

(30) Foreign Application Priority Data

Jan. 23, 2006    (JP) ............................... 2006-013974

(51) Int. Cl.
G06K 9/40      (2006.01)
H04N 5/228     (2006.01)
(52) U.S. Cl. ................................. 382/261; 348/208.99
(58) Field of Classification Search ................. 382/255, 382/199, 266, 263, 261, 286, 276; 348/208.99; 396/52
See application file for complete search history.

(56) References Cited

U.S. PATENT DOCUMENTS

| 5,604,560 A | * | 2/1997 | Kaneda ...................... 396/133 |
|---|---|---|---|
| 6,154,574 A | | 11/2000 | Paik et al. |
| 6,208,139 B1 | * | 3/2001 | Foo et al. ..................... 324/309 |
| 6,922,524 B2 | * | 7/2005 | Sato ............................ 396/52 |
| 6,928,182 B1 | | 8/2005 | Chui |
| 7,099,518 B2 | * | 8/2006 | Li et al. ....................... 382/255 |
| 7,181,082 B2 | * | 2/2007 | Feng .......................... 382/255 |
| 7,257,273 B2 | * | 8/2007 | Li et al. ....................... 382/286 |
| 7,359,562 B2 | * | 4/2008 | Raskar et al. ............... 382/254 |
| 7,551,772 B2 | * | 6/2009 | Lim et al. ................... 382/162 |
| 7,561,186 B2 | * | 7/2009 | Poon ..................... 348/208.99 |

FOREIGN PATENT DOCUMENTS

| JP | 10-124665 | 5/1998 |
|---|---|---|
| JP | 2001-223874 | 8/2001 |

OTHER PUBLICATIONS

Kubota and Aizawa, "Reconstructing Arbitrarily Focused Images from Two Differently Focused Images Using Linear Filters", IEEE Trans. Image Processing, 14(11), 1848-59, Nov. 2005.

Office Action issued in Japanese Patent Application No. 2006-013974, dated Feb. 17, 2010, with English Translation, 12 pages.

\* cited by examiner

*Primary Examiner*—Kanji Patel
(74) *Attorney, Agent, or Firm*—Sprinkle IP Law Group

(57) ABSTRACT

An image conversion device according to an example of the invention comprises a blur estimating unit which estimates a blur state of input image data, a blur changing unit which changes the blur state estimated by the blur estimating unit into an arbitrary blur state, and an image constructing unit which constructs output image data on the basis of a blur changing result obtained by the blur changing unit.

4 Claims, 12 Drawing Sheets

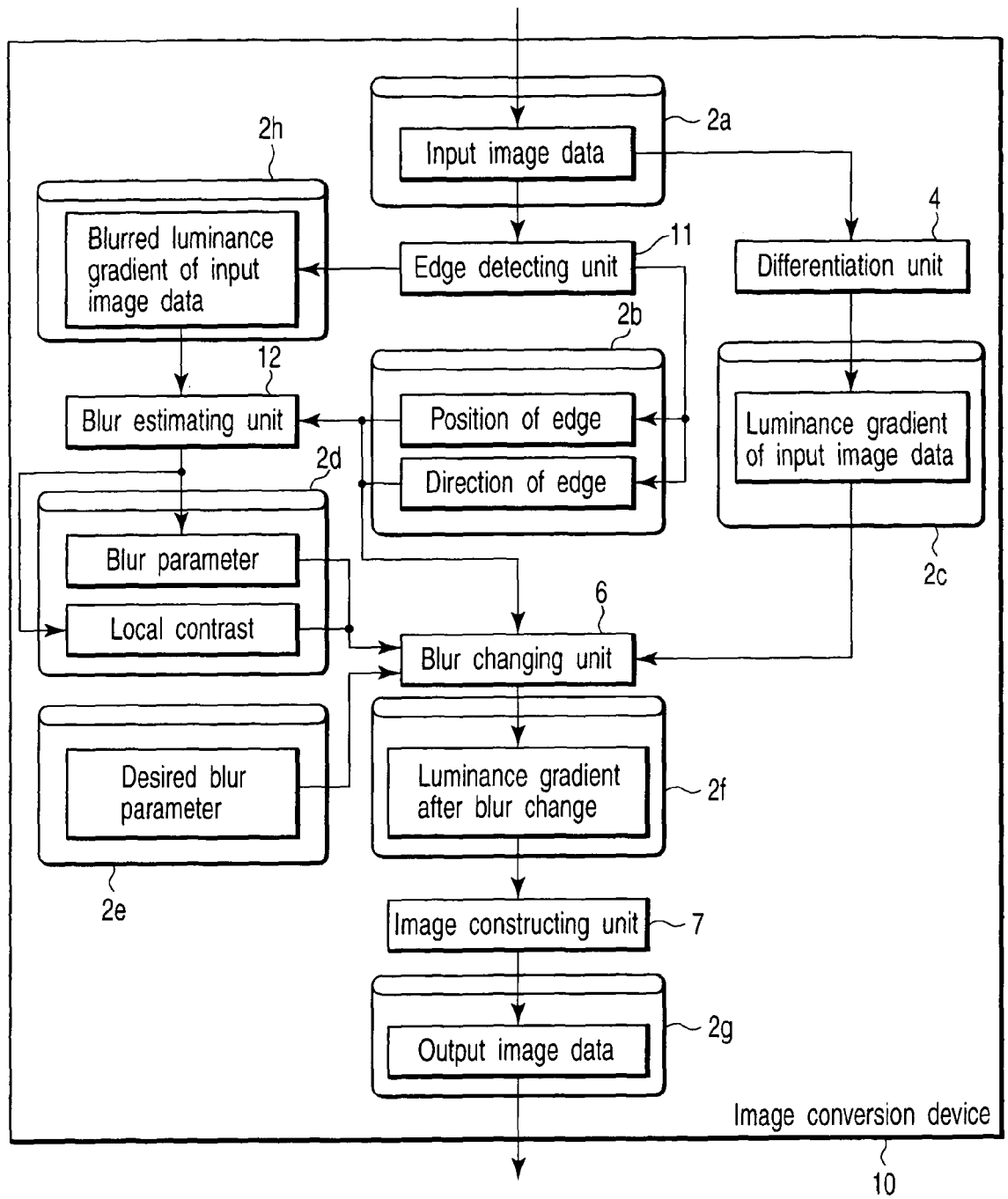
F I G. 11

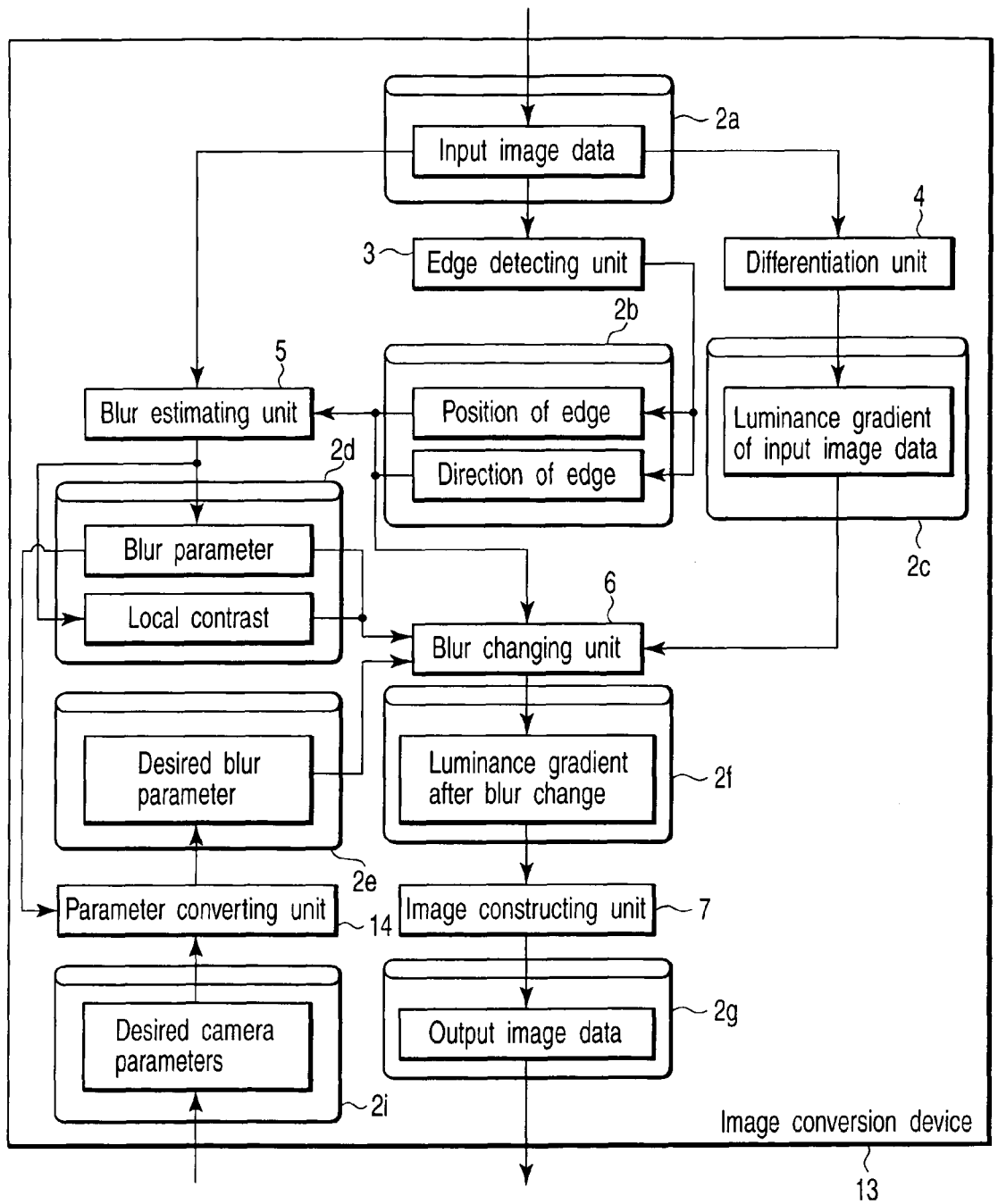
F I G. 1 2

IMAGE CONVERSION DEVICE, IMAGE CONVERSION METHOD, AND RECORDING MEDIUM

CROSS-REFERENCE TO RELATED APPLICATIONS

This application is based upon and claims the benefit of priority from prior Japanese Patent Application No. 2006-013974, field Jan. 23, 2006, the entire contents of which are incorporated herein by reference.

BACKGROUND OF THE INVENTION

1. Field of the Invention

The present invention relates to an image conversion device which changes a blur state in image data, an image conversion method, and a recording medium.

2. Description of the Related Art

There is available a technique called blind deconvolution, which separates one image data into a blur filter and clear image data.

Blind deconvolution estimates original image data and a blur filter from only input image data on the basis of a model in which the data obtained by applying a blur filter to sharp original image data is input image data. Reference 1 (U.S. Pat. No. 6,154,574) discloses a technique associated with blind deconvolution used when blur is uniform in entire image data.

Reference 2 (U.S. Pat. No. 6,928,182) discloses a technique which is used for edge sharpening by estimating blur around an edge detected from one image data and moving a luminance value from one side of the edge to the other side.

The technique disclosed in patent reference 1 is based on the condition that blur is uniform in entire image data. For this reason, it is difficult to apply the technique disclosed in patent reference 1 to image data in which different objects are arranged in the depth direction, and focal blur greatly changes.

The technique disclosed in patent reference 2 aims at only sharpening, and hence no consideration is given to the generation of image data in which the manner of blurring is changed from one image data.

BRIEF SUMMARY OF THE INVENTION

An image conversion device according to an example of the invention comprises a blur estimating unit which estimates a blur state of input image data; a blur changing unit which changes the blur state estimated by the blur estimating unit into an arbitrary blur state; and an image constructing unit which constructs output image data on the basis of a blur changing result obtained by the blur changing unit.

BRIEF DESCRIPTION OF THE SEVERAL VIEWS OF THE DRAWING

FIG. 11 is a block diagram showing an example of the arrangement of an image conversion device according to the third embodiment.

FIG. 12 is a block diagram showing an example of the arrangement of an image conversion device according to the fourth embodiment.

DETAILED DESCRIPTION OF THE INVENTION

Figure 1:
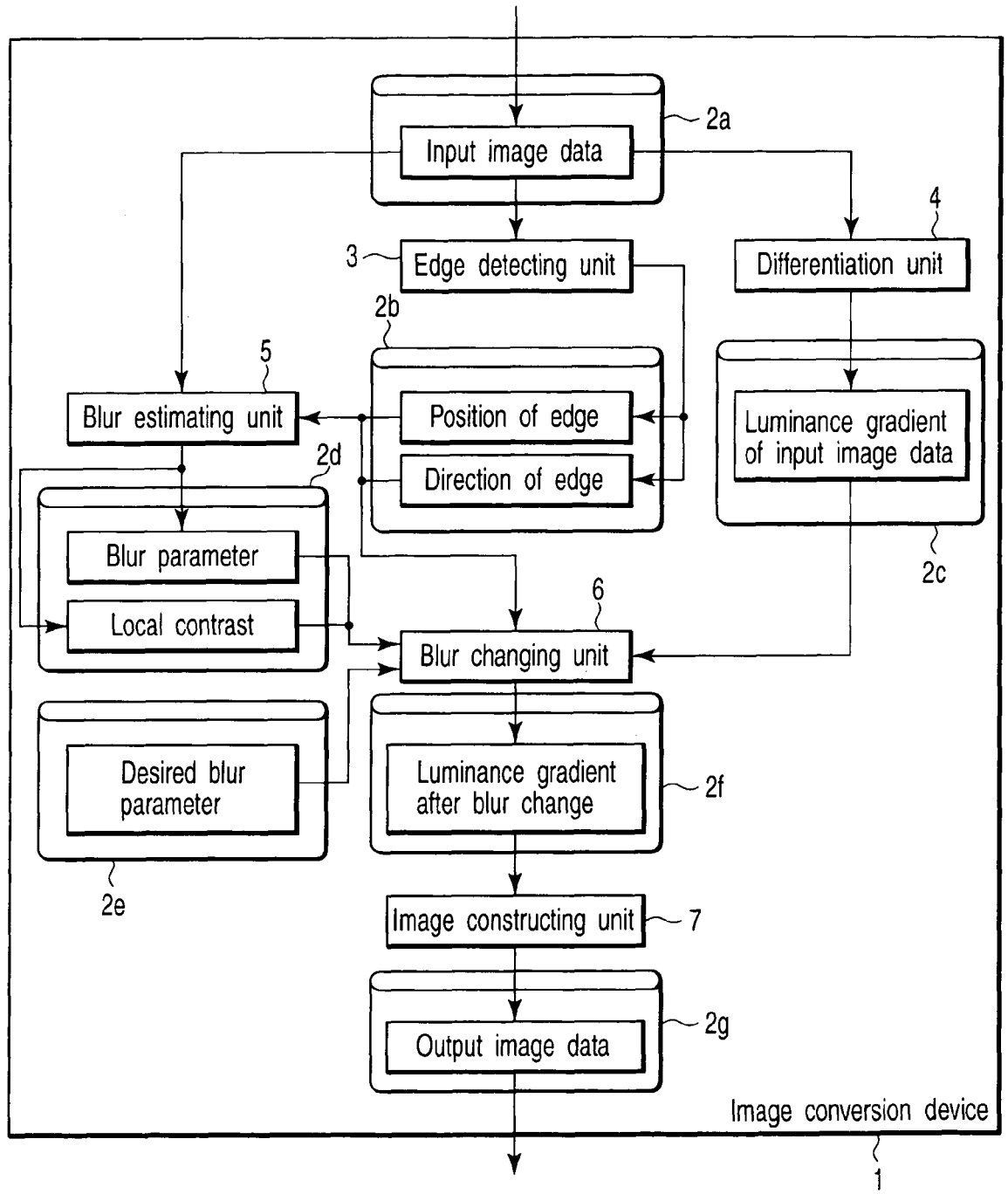
FIG. 1 is a block diagram showing an example of the arrangement of an image conversion device according to the first embodiment.

The embodiments of the present invention will be described below with reference to the views of the accompanying drawing. Note that the same reference numerals denote the same parts in the following drawings, and a description thereof will be omitted.

First Embodiment

This embodiment will exemplify an image conversion device which inputs one image data, partly changes a blur state in the image data, and outputs image data which differs in the manner of blurring from the input image data. Using the image conversion method of this image conversion device makes it possible to generate, for example, image data in which an object on the rear side is in focus and an object on the front side is out of focus from image data in which an object on the front side is in focus and an object on the rear side is out of focus.

FIG. 1 is a block diagram showing an example of the arrangement of an image conversion device according to the first embodiment.

An image conversion device 1 is a device which performs image processing such as processing/editing for image data. The image conversion device 1 detects an edge from image data, estimates blur around the edge, and constructs image data in which the blur is changed into different blur. The image conversion device 1 performs blur change with respect to a luminance gradient obtained by differentiating image data. This simplifies the calculation performed by the image conversion device 1 and speeds up the processing.

Image data to be used include, for example, photographic data obtained by a digital camera and data read by a scanner.

The image conversion device 1 comprises storage devices 2a to 2g, an edge detecting unit 3, a differentiation unit 4, a blur estimating unit 5, a blur changing unit 6, and an image constructing unit 7.

The edge detecting unit 3 reads input image data I(x, y) stored in the storage device 2a, and executes edge detection calculation for the input image data. The edge detecting unit 3 then stores coordinates $(a_i, b_i)$ of a pixel (edge point) determined as an edge and the direction or a normal vector $n_i$ of the edge at the coordinates $(a_i, b_i)$ in the storage device 2b. In this case, i represents the number of an edge point. An existing method can be used as an edge detection method.

The differentiation unit 4 reads the input image data I(x, y) stored in the storage device 2a, differentiates the input image data I(x, y) in the x direction (horizontal direction) and the y direction (vertical direction), and stores a luminance gradient grad(I)=($\partial I/\partial x$, $\partial I/\partial y$) of the input image data in the storage device 2c.

In practice, the input image data I(x, y) is expressed as discrete data $I_{i,j}$ (i=0, 1, ..., W−1; j=0, 1, ..., H−1; W: width of image; H: height of image). As differentiation methods for discrete data, various techniques, e.g., a technique using a Sobel filter, can be used.

For example, $\partial I/\partial x$ and $\partial I/\partial y$ are computed according to equations (1) and (2) given below:

$$\frac{\partial I}{\partial x} = (I_{i+1,j-1} - I_{i-1,j-1} + 2I_{i+1,j} - 2I_{i-1,j} + I_{i+1,j+1} - I_{i-1,j+1})/8 \quad (1)$$

$$\frac{\partial I}{\partial y} = (I_{i-1,j+1} - I_{i-1,j-1} 2I_{i,j+1} - 2I_{i,j+1} - 2I_{i,j-1} + I_{i+1,j+1} - I_{i+1,j-1})/8 \quad (2)$$

The blur estimating unit 5 reads the input image data stored in the storage device 2a and the edge position and edge direction stored in the storage device 2b, and estimates blur on the basis of the value of the input image around each edge point. The blur estimating unit 5 then stores a blur parameter and a local contrast as a blur estimation result in the storage device 2d.

A blur estimation method executed by the blur estimating unit 5 will be described below.

Blur in input image data is modeled by a blur function g(x, y; p) having a parameter p associated with the blur. If there are a plurality of parameters associated with blur, p represents a vector.

Consider a case wherein the step edge represented by equations (3) and (4) given below is blurred by this blur function g. Note that in equation (3); h0 represents a luminance on one side of an edge. In equation (4), h1 represents a luminance on the other side of the edge.

$$h(x,y)=h0 \text{ (in case of } x<0) \quad (3)$$

$$h(x,y)=h1 \text{ (in case of } x<0) \quad (4)$$

For the sake of convenience, a case wherein a step edge extends along the y-axis will be described below. However, the same technique is applicable for other general cases by setting the origin at an edge point of interest, the y-axis to the direction of the edge, and the x-axis to a direction perpendicular to the edge.

Equation (5) given below represents a luminance distribution when the step edge is blurred.

$$f(x,y;h0,h1,p)=h(x,y)*g(x,y;p) \quad (5)$$

where "*" is two-dimensional convolution. For example, equation (7) given below represents the result obtained by modeling blur using the Gaussian of equation (6) having a blur radium r as a parameter:

$$G(x,y;r)=\exp\{-(x^2+y^2)/(2r^2)\}/(2\pi r^2) \quad (6)$$

$$f(x,y;h0,h1,r)=(h1-h0)\text{erf}\{x/(r\sqrt{2})\}/2+(h1+h0)/2 \quad (7)$$

where erf(x) represents an error function. Consider an edge along the y-axis described above. In this case, f is a function independent of y.

Figure 2:
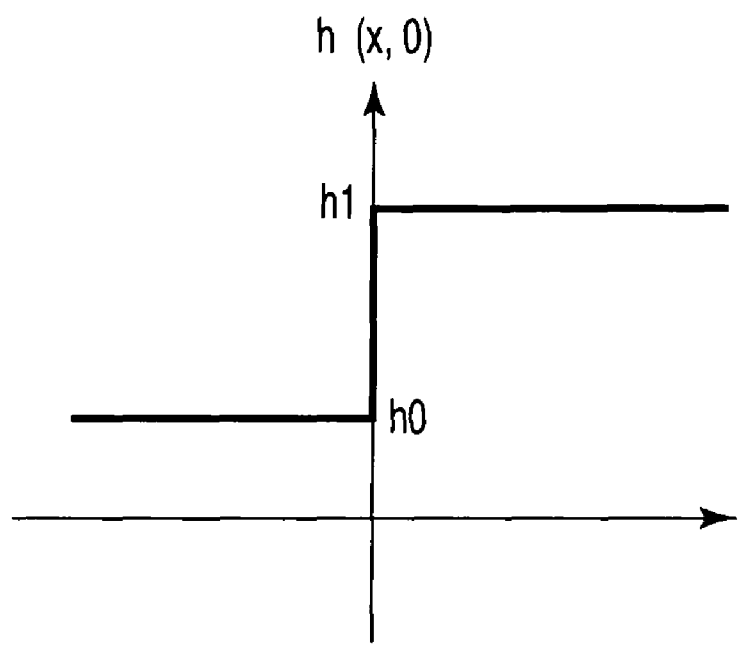
FIG. 2 shows an example of a cross-section h(x, 0) at y=0 of a step edge.

FIG. 2 shows an example of a cross-section h(x, 0) at y=0 of a step edge.

Figure 3:
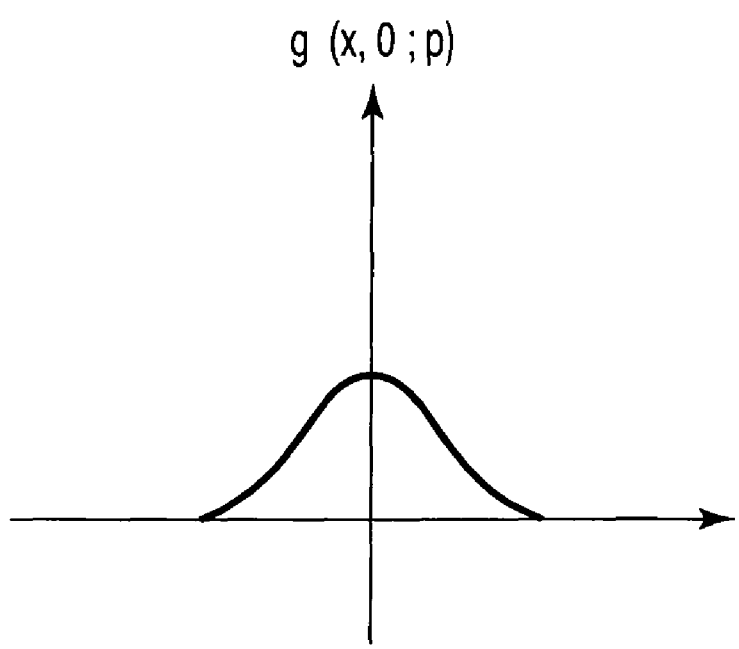
FIG. 3 shows an example of cross-section g(x, 0; p) at y=0 of a blur function.

FIG. 3 shows an example of cross-section g(x, 0: p) at y=0 of a blur function.

Figure 4:
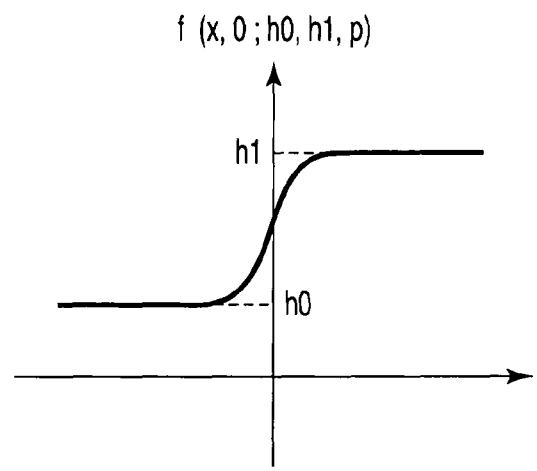
FIG. 4 shows an example of a cross-section f(x, 0; h0, h1, p) at y=0 of a blurred edge.

FIG. 4 shows an example of a cross-section f(x, 0: h0, h1, p) at y=0 of a blurred edge.

Blur is estimated by obtaining h0, h1, and p such that equation (5) is approximated to a luminance distribution $I(x+a_i, y+b_i)$ of input image data around an edge point $(a_i, b_i)$.

This blur estimation employs least squares fitting. It suffices to one-dimensionally perform least squares fitting in the normal $n_i$ direction of an edge. For the above edge along the y-axis, fitting is performed for f(x, 0; h0, h1, p) and $I(x+a_i, b_i)$ in the x direction with y=0.

The blur estimating unit 5 then stores a blur parameter p estimated at each edge point and a local contrast c (a luminance difference (h1−h0) between the two sides of an edge) in the storage device 2d.

The blur changing unit 6 reads the edge position and edge direction stored in the storage device 2b, the luminance gradient grad(I)=($\partial i/\partial x$, $\partial I/\partial y$) of the input image data stored in the storage device 2c, the blur parameter and local contrast stored in the storage device 2d, and the desired blur parameter stored in the storage device 2e.

The blur changing unit 6 changes the blur estimated at each edge point into blur corresponding to the desired blur parameter, and stores the luminance gradient after the blur change in the storage unit 2f.

In this case, the desired blur parameter represents a desired blur state after blur change. More specifically, the desired blur parameter is a blur parameter q of the output image data obtained after blur change and image construction. Blur change is performed for the luminance gradient grad(I) of the input image data. For the sake of simplicity, the following will exemplify a case wherein an edge extends along the y-axis, as in the above case.

Differentiating equation (5) with respect to x yields equation (8) given below:

$$\partial f/\partial x = \partial h/\partial x*g(x,y;p)=(h1-h0)\delta(x)*g(x,y;p)=c\int g(x,y;p)dy \quad (8)$$

where δ(x) is a Dirac delta function. Equation (8) indicates that the differentiation of the blurred edge is equivalent to the integration of the c-fold blur function along the edge. In terms of one dimension, this is equivalent to obtaining the c-fold blur function in FIG. 3 by differentiating the blurred edge in FIG. 4 obtained by multiplying the step edge in FIG. 2 by the blur function in FIG. 3. The luminance gradient after blur change which is indicated by equation (9) may be given below by subtracting the blur function of the blur parameter p along the edge from the luminance gradient of the input image and adding the blur function of the desired blur parameter q to the luminance gradient of the input image.

$$\partial f'/\partial x = c\int g(x,y;q)dy \quad (9)$$

In equation (9), f' represents the edge blurred by the blur parameter q as compared with equation (8).

Figure 5:
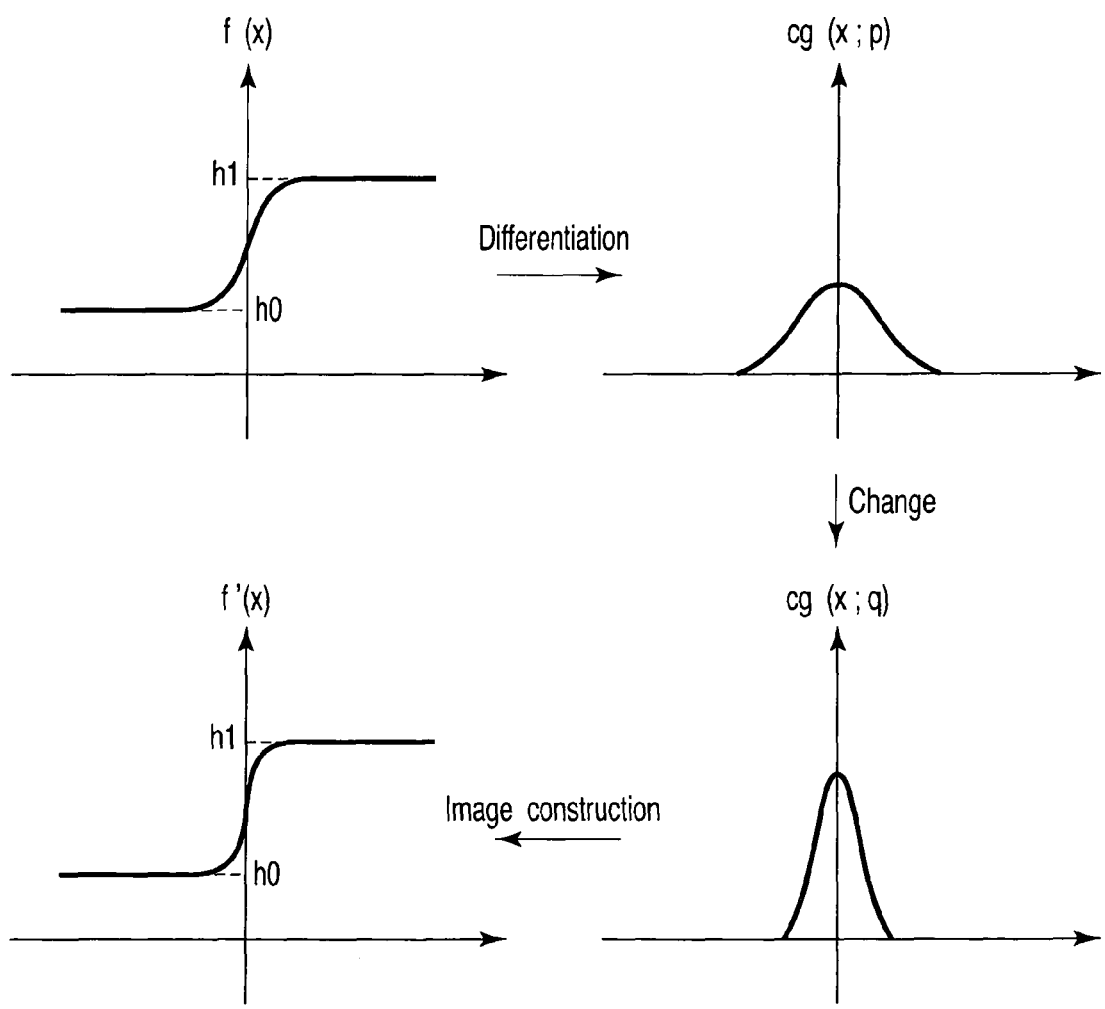
FIG. 5 is a graph showing an example of the concept of blur change and image construction in the first embodiment.

FIG. 5 is a graph showing an example of the concept of blur change and image construction in this embodiment. FIG. 5 exemplifies a one-dimensional case.

A blur parameter p is obtained with respect to an edge point of input image data, and the blur parameter p is changed into a blur parameter q, thereby forming output image data constructed in accordance with the blur parameter q.

In order to execute blur change according to this embodiment, the blur changing unit 6 calculates a luminance gradient $(I_x', I_y')$ after blur change as the result of changing a blur parameter $P_i$ into a blur parameter $q_i$ with respect to all edge points $(a_i, b_i)$ according to equation (10) given below, and stores the luminance gradient $(I_x', I_y')$ after blur change in the storage device 2f.

$$(I_x', I_y') = grad(I) + \sum c_i \{g(x - a_i, y - b_i; q_i) - g(x - a_i, y - b_i; p_i)\} n_i \quad (10)$$

where $c_i$ is a local contrast at the edge point $(a_i, b_i)$, and $n_i$ is a normalized edge normal.

The image constructing unit 7 reads the luminance gradient $(I_x', I_y')$ after blur change stored in the storage device 2f, and generates output image data I' which comprises the luminance gradient $(I_x', I_y')$ after blur change. The image constructing unit 7 then stores the output image data I' in the storage device 2g.

The image constructing unit 7 calculates the output image data I' which satisfies relational expressions like equations (11) and (12) given below:

$$\partial I'/\partial x = I_x' \quad (11)$$

$$\partial I'/\partial y = I_y' \quad (12)$$

The output image data I' which satisfy equations (11) and (12) is obtained by minimizing the root mean square of the error. That is, the output image data I' which satisfy equations (11) and (12) is obtained by solving equation (13) given below:

$$(\partial^2/\partial x^2 + \partial^2/\partial y^2)I' = \partial I_x'/\partial x + \partial I_y'/\partial y \quad (13)$$

Equation (13) is a Poisson equation. As a linear equation as a discretization of this Poisson equation, the iterative solution of a sparse matrix such as the Jacobi method, Gauss-Seidel method, or conjugate gradient method can be used. This equation can be solved by diagonalization by discrete Fourier transform, the multi-grid method, or the like at high speed. A boundary condition of the equation is provided with a pixel value on a border of an input window.

In this embodiment, since only a blur state is changed, a solution is expected to be very similar to the input image data I. When this equation is to be solved by the iterative method, convergence can be expected to be speeded up by setting the input image data as an initial approximate value.

Figure 6:
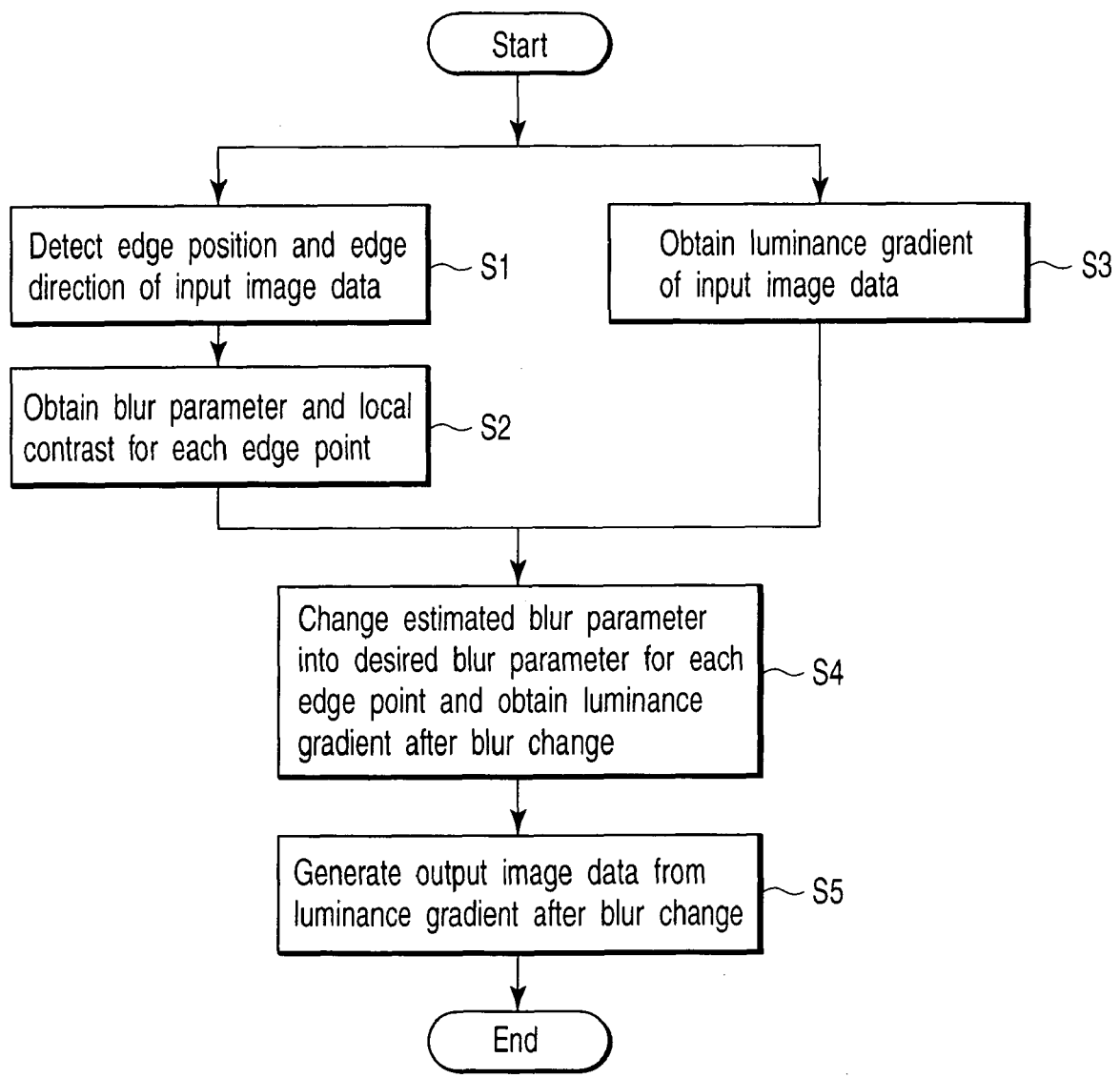
FIG. 6 is a flowchart showing an example of processing by the image conversion device according to the first embodiment.

FIG. 6 is a flowchart showing an example of processing by the image conversion device 1 according to this embodiment.

In step S1, the edge detecting unit 3 detects the position of an edge point and an edge direction of the input image data I(x, y) on the basis of the input image data I(x, y).

In step S2, the blur estimating unit 5 estimates the blur parameter p and obtains the local contrast c with respect to each edge point on the basis of the input image data I(x, y) and the position of the edge point and the edge direction of the input image data I(x, y).

In step S3, the differentiation unit 4 differentiates the input image data I(x, y) in the x direction (horizontal direction) and the y direction (vertical direction) to obtain the luminance gradient $grad(I) = (\partial I/\partial x, \partial I/\partial y)$ of the input image data I(x, y).

Note that step S3 may be executed before steps S1 and S2, or executed in parallel with steps S1 and S2, or executed after steps S1 and S2.

In step S4, the blur changing unit 6 changes the blur represented by the estimated blur parameter p into blur corresponding to a desired blur parameter with respect to each edge point to obtain a luminance gradient after blur change.

In step S5, the image constructing unit 7 generates the output image data I' by integrating the luminance gradients after blur change.

An outline of blur conversion according to this embodiment will be described below by taking a one-dimensional case as an example with reference to FIGS. 7 to 9.

Figure 7:
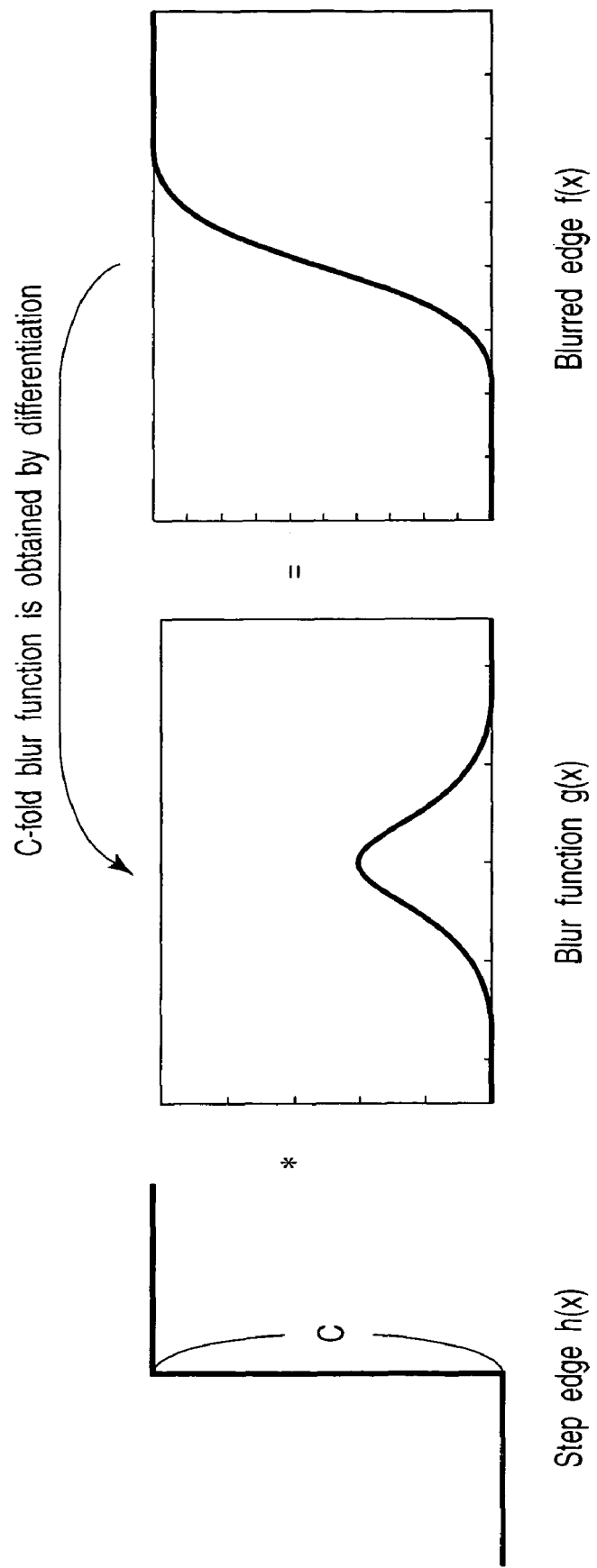
FIG. 7 is a view showing an example of the relationship between an edge and a blur function in a one-dimensional case.

FIG. 7 is a view showing an example of the relationship between an edge and a blur function in a one-dimensional case.

In FIG. 7, a step edge h(x) is blurred. And the blurred step edge h(x) is corresponded to a blurred edge f(x) of the input image. The blurred edge f(x) can be obtained by the convolution between the step edge h(x) and a blur function g(x) representing a blur state.

That is, equation (14) given below can be obtained:

$$f(x) = h(x) * g(x) \quad (14)$$

Differentiating the both sides of equation (14) can yield equation (15) given below.

$$df/dx = dh/dx * g(x) = c\delta(x) * g(x) = cg(x) \quad (15)$$

As a consequence, a blur function g(x) can be obtained by differentiating the blurred edge f(x). That is, blur can be estimated from a luminance gradient distribution around an edge of input image data.

In blur conversion according to this embodiment, therefore, an edge position is detected by differentiating input image data. Subsequently, blur estimation and blur change are locally performed for each edge point.

In this case, assuming that blur is in a Gaussian state, blur estimation is performed by using a Gaussian.

Figure 8:
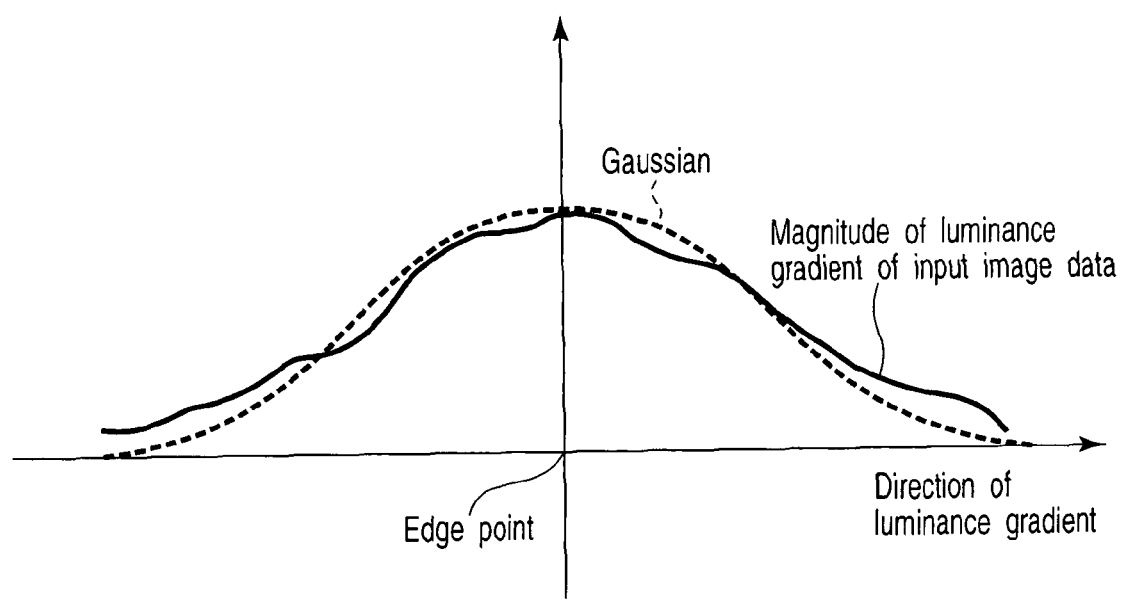
FIG. 8 is a graph showing an example of a blur estimation result obtained by fitting Gaussian to a differential distribution (luminance gradient) in a direction perpendicular to an edge direction with respect to a given edge point.

FIG. 8 is a graph showing an example of the blur estimation result obtained by fitting the Gaussian to a differential distribution (luminance gradient) in a direction perpendicular to the edge direction with respect to a given edge point. The standard deviation of the Gaussian corresponds to a blur radius.

Blur change is then performed to change the blur estimation result into desired blur.

Figure 9:
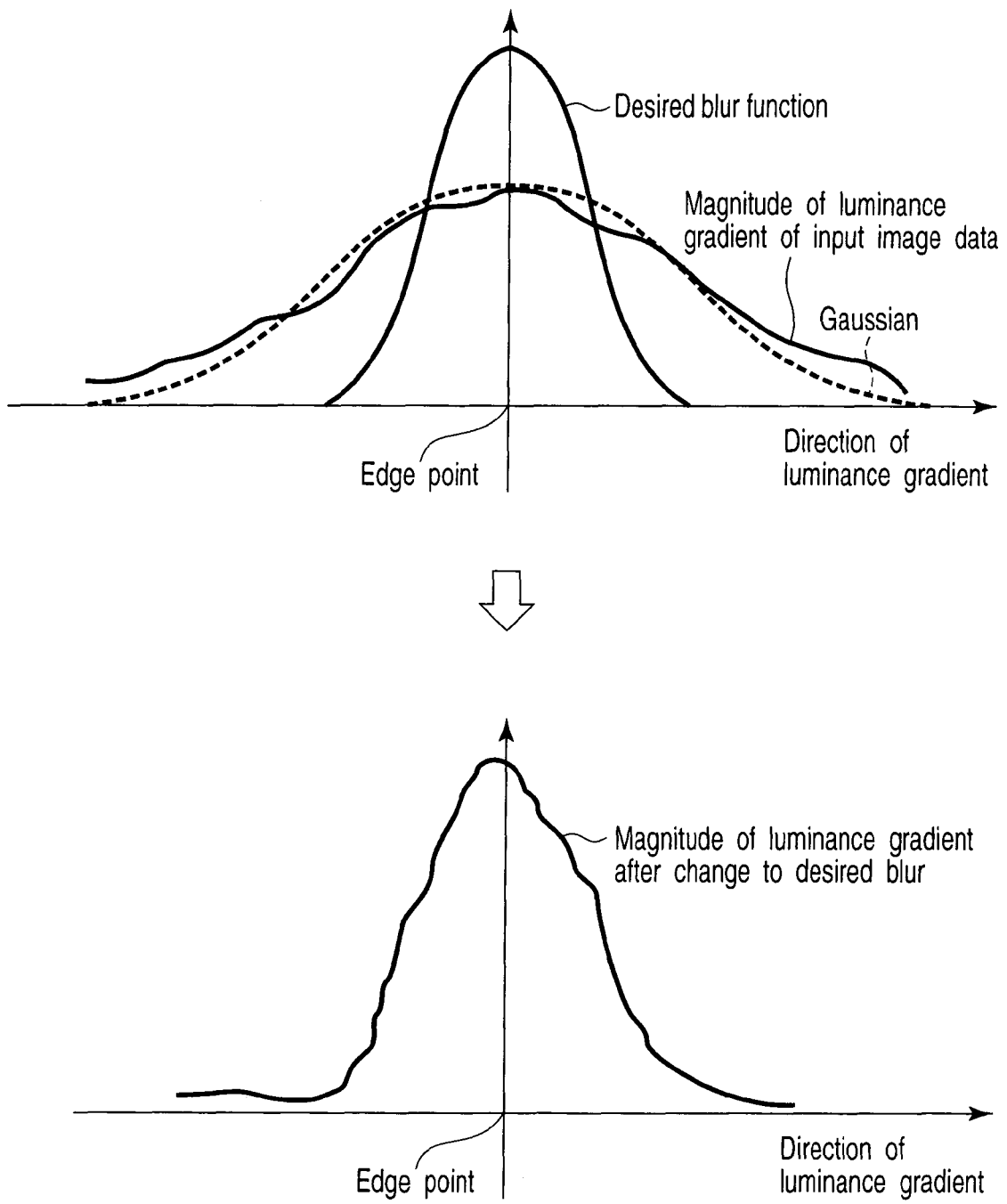
FIG. 9 is a graph showing an example of a result obtained by changing the estimated blur into desired blur with respect to a luminance gradient around given edge point x=a in a one-dimensional case.

FIG. 9 is a graph showing an example of the result obtained by changing the estimated blur into desired blur with respect to a luminance gradient around given edge point x=a in a one-dimensional case.

Equation (16) given below represents the relationship between a luminance gradient grad(I') after blur change, a luminance gradient grad(I) before change, an estimated blur radius r, an estimated local contrast c, and a desired blur radius s. Blur change is performed by computing equation (16):

$$grad(I') = grad(I) - cG(x-a; r) + cG(x-a; s) \quad (16)$$

where G(x; r) is a one-dimensional Gaussian with a standard deviation r.

After blur change, image construction is performed by using equations (11) to (13) described above.

The image conversion device 1 according to this embodiment described above detects the position and direction of an edge from input image data by using the edge detecting unit 3, calculates a luminance gradient by differentiating the input image data using the differentiation unit 4, and estimates a blur parameter and the local constant of the edge at each edge position on the basis of the input image data and the edge direction by using the blur estimating unit 5.

The image conversion device 1 causes the blur changing unit 6 to change the blur parameter, which is estimated on the basis of the luminance gradient and edge direction of the input image data and the estimated local constant at each edge position, into a desired blur parameter, thereby generating a luminance gradient. The image conversion device 1 then causes the image constructing unit 7 to generate output image data from the luminance gradient obtained by change into the desired blur parameter.

This makes it possible to generate output image data by arbitrarily and locally changing blur in input image data.

This embodiment can arbitrarily generate output image data with different blur states from one input image data. That is, one general two-dimensional image data is input, and blur in the data can be easily converted. This eliminates the necessity to prepare any other special devices for inputting image data.

In this embodiment, since the blur estimating unit 5 and blur changing unit 6 are designed to model blur with a function, the blur can be concisely represented by several parameters. This embodiment uses a Gaussian as a blur function. Using a function having mathematically favorable characteristics in this manner makes it possible to easily perform analysis. As in this embodiment, using a blur radius as a blur parameter makes it possible to concisely represent blur by using one parameter.

In this embodiment, the blur estimating unit 5 estimates blur by fitting input image data and a step edge blurred by a blur function. This can simplify the problem of blur estimation into the problem of fitting of a function and data.

The blur changing unit 6 according to this embodiment performs blur change by adding/subtracting a blur function to/from the luminance gradient of input image data. This can simplify arithmetic processing for blur change.

Since this embodiment is configured to locally estimate blur around an edge of input image data and change the blur, blur contained in the input image data and desired blur in output image data may differ in state depending on positions on an image instead of being uniform in the entire image. In this embodiment, even if a blur state in one image data is not uniform and changes, image data in which this blur state is arbitrarily changed can be generated.

The image constructing unit 7 according to this embodiment performs image construction to generate output image data by applying the iterative method using input image data as an initial approximate solution. That is, in image construction processing according to this embodiment, a fast solution can be used, and a proper initial approximate solution can be provided. This embodiment can therefore easily reduce the calculation amount of processing and increase the processing speed.

The blur estimating unit 5 and blur changing unit 6 according to this embodiment locally perform blur estimation processing and blur change processing for a portion around an edge detected from input image data. This can facilitate and speed up calculation.

This embodiment is configured to change blur in the form of changing the luminance gradient grad(I) of the input image data I(x, y). For this reason, with regard to an area free from the influence of blur, the same data as input image data can be output, and hence there is no need to make any unnecessary change in image quality. This makes it difficult to cause a deterioration in image quality.

Second Embodiment

This embodiment will exemplify a modification of the first embodiment.

The blur estimating unit 5 according to the first embodiment receives input image data. A blur estimating unit according to the second embodiment receives the luminance gradient of input image data instead of input image data, and obtains a blur parameter and a local contrast.

Figure 10:
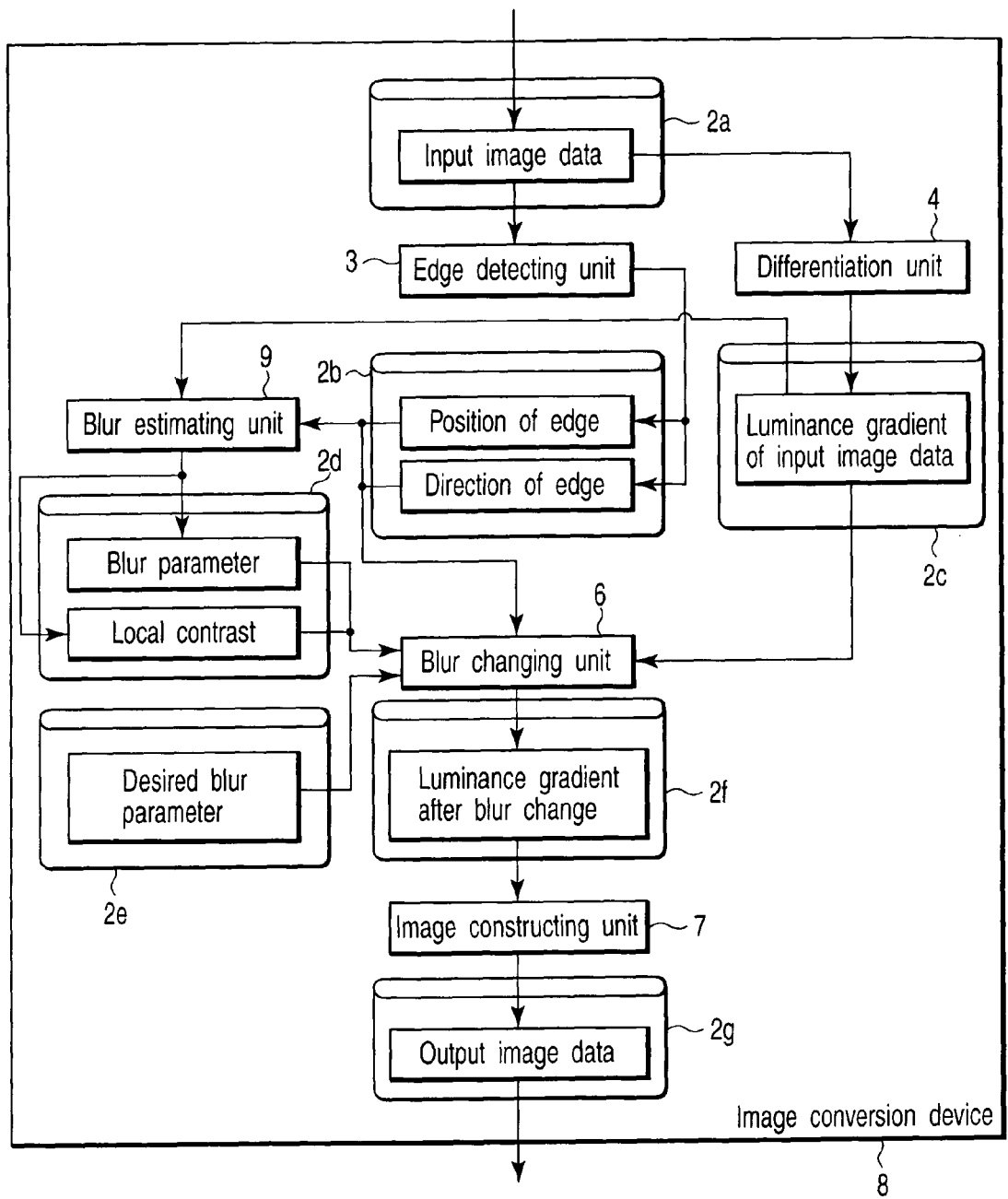
FIG. 10 is a block diagram showing an example of the arrangement of an image conversion device according to the second embodiment.

FIG. 10 is a block diagram showing an example of the arrangement of an image conversion device according to this embodiment.

The blur estimating unit 5 of the image conversion device 1 according to the first embodiment fits equation (5) to the luminance distribution I of the input image data. In contrast, a blur estimating unit 9 of the image conversion device 8 of the second embodiment performs blur estimation by using both the differentiation results obtained by equation (5) and the luminance distribution I of the input image data.

The blur estimating unit 9 according to this embodiment inputs the luminance gradient of input image data obtained by a differentiation unit 4 instead of the input image data, and estimates blur by fitting the luminance gradient of the input image data and a blur function.

The blur estimating unit 9 obtains a blur parameter p and a local contrast c by fitting equation (8) as a differentiation result of equation (5) to a magnitude |grad(I)| of the luminance gradient of the input image data.

The information of a constant portion is lost by differentiation. However, luminance values h0 and h1 at the two ends of an edge need not be used for subsequent processing, and it suffices to use only a difference c between the luminance values h0 and h1 at the two ends of the edge. It therefore does not matter whether the information of a constant portion is lost. The information of a constant portion is provided as a boundary condition at the time of image construction based on equation (13).

When blur is modeled by the Gaussian of equation (6), equation (8) is transformed into equation (17) given below:

$$\frac{\partial f}{\partial x} = c \int G(x, y; r) dy = c \cdot \exp\{-x^2/(2r^2)\}/\left(r\sqrt{(2\pi)}\right) \quad (17)$$

In this embodiment described above, fitting equation (8) to the luminance gradient (I) of the input image data makes it possible to reduce the number of parameters of fitting by one as compared with the first embodiment. This embodiment can therefore reduce the calculation amount required for fitting and facilitate processing, thereby increasing the stability of fitting.

Third Embodiment

This embodiment will exemplify a modification of the first or second embodiment.

The blur estimating unit 5 of the image conversion device 1 according to the first embodiment receives input image data. The blur estimating unit 9 of the image conversion device 1 according to the second embodiment receives the luminance gradient of input image data obtained by the differentiation unit 4.

Instead of this operation, an edge detecting unit of the image conversion device according to this embodiment obtains a blurred luminance gradient of the input image data in addition to an edge position and direction. A blur estimating unit of the image conversion device of this embodiment receives the edge position, the edge direction, and the luminance gradient of the input image data which are obtained by the edge detecting unit, and obtains a blur parameter and a local contrast.

FIG. 11 is a block diagram showing an example of the arrangement of the image conversion device according to this embodiment.

An edge detecting unit 11 of an image conversion device 10 stores, in a storage device 2b, the edge position and edge direction of input image data by using a technique such as the Canny detection scheme. The edge detecting unit 11 further generates the blurred luminance gradient of the input image data, and stores the blurred luminance gradient of the input image data in a storage device 2h.

The blurred luminance gradient of the input image data is obtained by applying a Gaussian derivative filter to the input image data, as indicated by equation (18):

$$grad(I) = \left(\frac{\partial G(x, y; s)}{\partial x * I(x, y)}\right), \left(\frac{\partial G(x, y; s)}{\partial y * I(x, y)}\right) \quad (18)$$

Estimating blur by fitting equation (8) to the blurred luminance gradient of the input image data using a blur estimating unit 12 is equivalent to estimating blur with respect to the image data blurred by applying a Gaussian filter with a standard deviation s to input image data. For this reason, the blur estimating unit 12 estimates blur larger than actual blur in input image data.

That is, in this embodiment, letting p be the blur parameter obtained by the blur estimating unit 12, the relationship represented by equation (19) holds between the blur parameter p of the blurred input image data and an actual blur parameter t of the input image data.

$$g(x,y;p)=g(x,y;t)*G(x,y;s) \quad (19)$$

The blur estimating unit 12 in this embodiment obtains the parameter t according to equation (19) and sets the parameter t as the final estimated value of the blur parameter.

When a blur function g is modeled by a Gaussian G, equation (19) is transformed into equation (20):

$$p^2=t^2+s^2 \quad (20)$$

Note that when the edge detection method of locally changing s of equation (18) using the edge detecting unit 11 is used, the value of s needs to also be reflected in equation (19).

In this embodiment, the blur estimating unit 12 performs blur estimation by using the blurred luminance gradient of the input image data generated by the edge detecting unit 11 instead of the input image data. Performing blur estimation after the luminance gradient of input image data is properly blurred in this manner makes it possible to reduce the influence of noise included in the input image data and improve the reliability of blur estimation. The blur estimating unit 12 reuses the blurred luminance gradient of the image data generated by the edge detecting unit 11 for edge detection. This eliminates the necessity to add any computation cost.

Fourth Embodiment

This embodiment will exemplify modifications of the first to third embodiments. A modification of the image conversion device 1 according to the first embodiment will be described below. However, the following description applies to modifications of the image conversion device 8 and 10 according to other embodiments.

FIG. 12 is a block diagram showing an example of the arrangement of an image conversion device according to this embodiment.

In the first embodiment, a desired blur parameter is stored in the storage device 2e. In the first embodiment, for example, a desired blur parameter is externally input.

In contrast to this, an image conversion device 13 according to this embodiment inputs desired camera parameters, and stores the desired camera parameters in a storage device 2i. A parameter converting unit 14 then loads the desired camera parameters stored in the storage device 2i, generates a desired blur parameter, and stores the desired blur parameter in a storage device 2e.

The parameter converting unit 14 reads the estimated blur parameter stored in a storage device 2d and the desired camera parameters stored in the storage device 2i, calculates a new desired blur parameter on the basis of the estimated blur parameter and the desired camera parameters, and stores the desired blur parameter in a storage device 2e.

This embodiment considers a simple thin lens model.

Assume that there are three camera parameters to be used, namely a focal length F, an f-number f, and a distance v between a lens and an image plane. Assume that a blur parameter is a blur radius r.

Equation (21) represents the relationship between the focal length F, the f-number f, the distance v between the lens and the image plane, the blur radius r, and a distance D to an object.

$$D=Fv/(v-F-rf) \quad (21)$$

Letting F0, f0, and v0 be initial camera parameters, the distance D is calculated from an estimated blur radius r0 according to equations (22) and (23):

$$D=F0v0/(v0-F0-tf0) \quad (22)$$

$$|t|=r0 \quad (23)$$

In equation (22), a blur radius t is a value with a sign. When the focus is adjusted, distance D0=F0v0/(v0−F0) at which t=0. In this case, if D<D0, t<0, and if D>D0, t>0.

Since an estimated value of a blur radius is generally given by |t|×r0, the distance D has a degree of freedom, the distance D is calculated depending on whether t=r0 or t=−r0. This selection requires higher-order information. If, for example, it is known that all objects in a scene satisfy D>D0, t=r0. Alternatively, the user may select t=r0 or t=−r0.

The blur radius (desired blur parameter) r corresponding to the desired camera parameters F, f, and v can be obtained by substituting the distance D calculated by equation (22) into equation (24) solved with respect to r of equation (21).

$$r=vF/f(1/F-1/v-1/D) \quad (24)$$

The image conversion device 13 according to this embodiment described above comprises the parameter converting unit 14. Input desired camera parameters are automatically converted into a desired blur parameter. A blur changing unit 6 inputs the desired blur parameter after conversion.

This embodiment therefore allows to input camera parameters defined from the physical/optical viewpoint without directly inputting any desired blur parameter defined from the image processing viewpoint. The embodiment obtains a desired blur parameter from camera parameters and performs blur change by using the camera parameters. This makes blur change intuitive and easily controllable.

This embodiment uses the focal length of the thin lens model, an f-number, and the distance between the lens and an image plane as camera parameters. This can facilitate conversion calculation from camera parameters to a blur parameter.

Fifth Embodiment

This embodiment exemplifies modifications of the first to fifth embodiments and a case wherein input image data is color image data. A modification of the image conversion device 10 according to the third embodiment will be described below. However, the following description applies to a case wherein the image conversion devices 1, 8, and 13 according to other embodiments are modified. This embodiment will exemplify a case wherein the number of components of input image data as color image data is three. However, the number of components can be arbitrarily changed.

Figure 13:
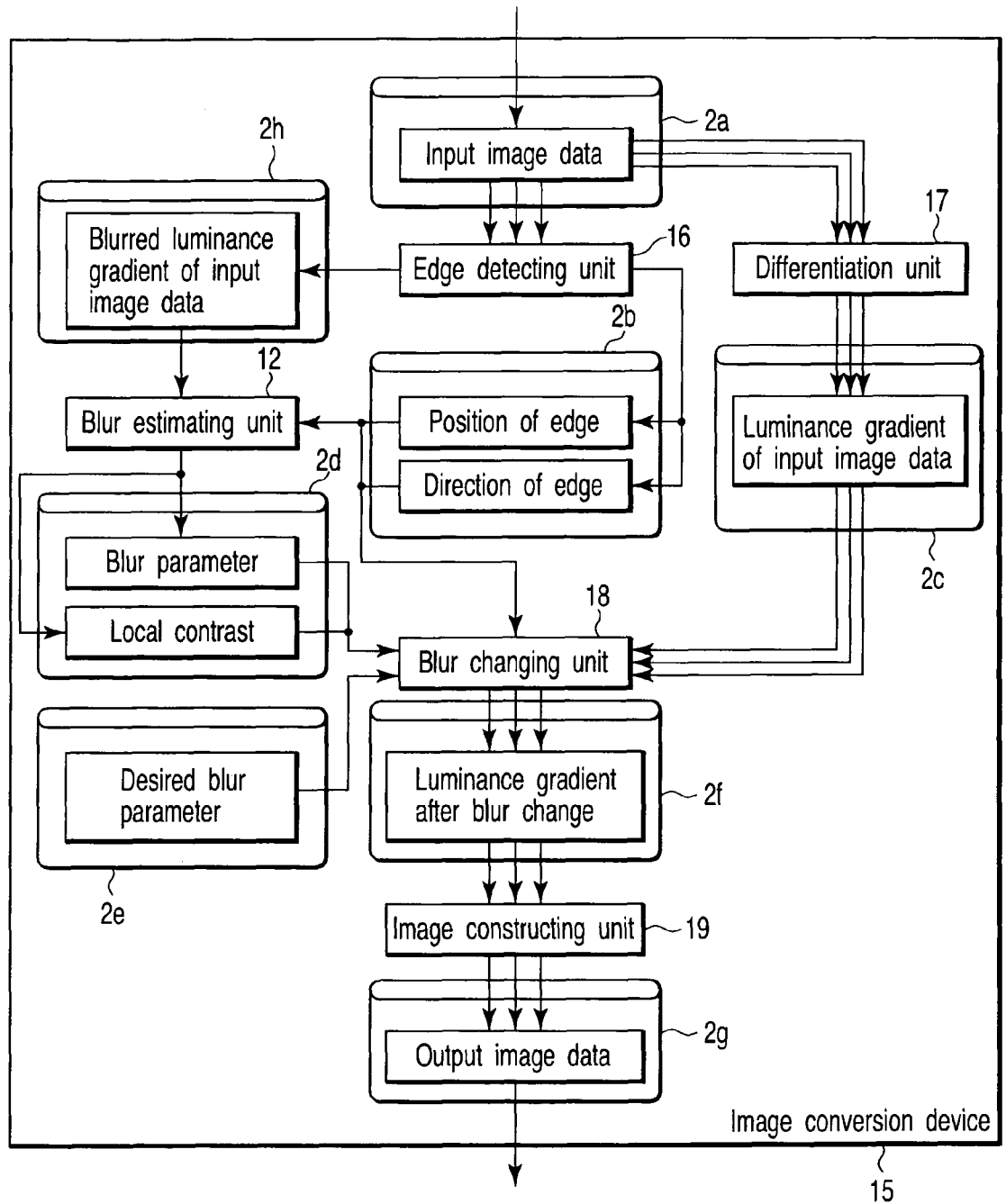
FIG. 13 is a block diagram showing an example of the arrangement of an image conversion device according to the fifth embodiment.

FIG. 13 is a block diagram showing an example of the arrangement of an image conversion device according to this embodiment.

Input image data stored in a storage device 2a of an image conversion device 15 according to this embodiment contains a plurality of components, e.g., R, G, and B.

An edge detecting unit 16 stores an edge position and an edge direction in a storage device 2b by using en edge detection method corresponding to a plurality of components.

In this embodiment, the edge detecting unit 16 calculates a blurred luminance gradient $\text{grad}(I_j)$ for each component j by using equation (18). The edge detecting unit 16 forms one blurred luminance gradient $(I_x, I_y)$ by selecting a component k exhibiting the maximum magnitude of a luminance gradient for each pixel as indicated by equation (25), and stores the luminance gradient $(I_x, I_y)$ in a storage device 2h.

$$(I_x, I_y) = \text{grad}(I_k) s \cdot t \cdot |\text{grad}(I_k)| = \max\{|\text{grad}(I_k)|\} \text{ for each } (x,y) \quad (25)$$

An edge detection method in the edge detecting unit 16, for example, can employ the Cumani edge detection method.

the edge detecting unit 16 and the blur estimating unit 12 according to this embodiment is the same as the the edge detecting unit and blur estimating unit described in each embodiment except that blurred luminance gradients are combined into one.

The adequacy of combining luminance gradients into one is ensured from the fact that blur in image data does not depend on the wavelength of light in a range in which chromatic aberration can be neglected.

A differentiation unit 17 reads the input image data stored in the storage device 2a, obtains the luminance gradient of each component contained in the input image data, and stores the luminance gradient of each component in a storage device 2c.

A blur changing unit 18 reads the edge position and direction stored in the storage device 2b, the luminance gradient of each component of the input image data stored in the storage device 2c, the blur parameter and local contrast stored in the storage device 2d, and the desired blur parameter stored in the storage device 2e.

The blur changing unit 18 in this embodiment uses a mathematical expression which converts a local contrast $c_i$ expressed by equation (10) into equations (26) and (27).

At an edge point i, as indicated by equation (25), $c_i$ is an estimated value with respect to a component k, and hence another component j is scaled in accordance with the ratio of luminance gradients. That is, in this embodiment, equations (26) and (27) given below represent a local contrast $c_{i,j}$ with respect to the component j.

$$c_{i,j} = c_i \text{ for } j=k \quad (26)$$

$$c_{i,j} = c_i |\text{grad}(I_j)|/|\text{grad}(I_k)| \text{ for } j \neq k \quad (27)$$

The blur changing unit 18 stores the luminance gradient of each component after blur change in a storage device 2f. An image constructing unit 19 stores output image data containing image construction data for each component in a storage device 2g.

In this embodiment described above, the differentiation unit 17, blur changing unit 18, and image constructing unit 19 execute processing for each component of input image data as color image data. The edge detecting unit 16 obtains one blurred luminance gradient of the input image data from a plurality of components.

In this embodiment, local blur conversion can be performed even for color image data. In the embodiment, since edge detection and blur estimation can be performed by one operation regardless of the number of components, the calculation amount can be reduced as compared with a case wherein each component is independently handled. This makes it possible to speed up the processing.

Sixth Embodiment

An image conversion device according to this embodiment is a modification of the first to fifth embodiments. The image conversion device according to this embodiment executes pre-processing for input image data, and executes post-processing for image data constructed by an image constructing unit, thereby increasing the accuracy of blur conversion. Although a modification of the image conversion device 15 according to the fifth embodiment will be described below, the following description applies to modifications of the image conversion devices 1, 8, 10, and 13 according to other embodiments.

Figure 14:
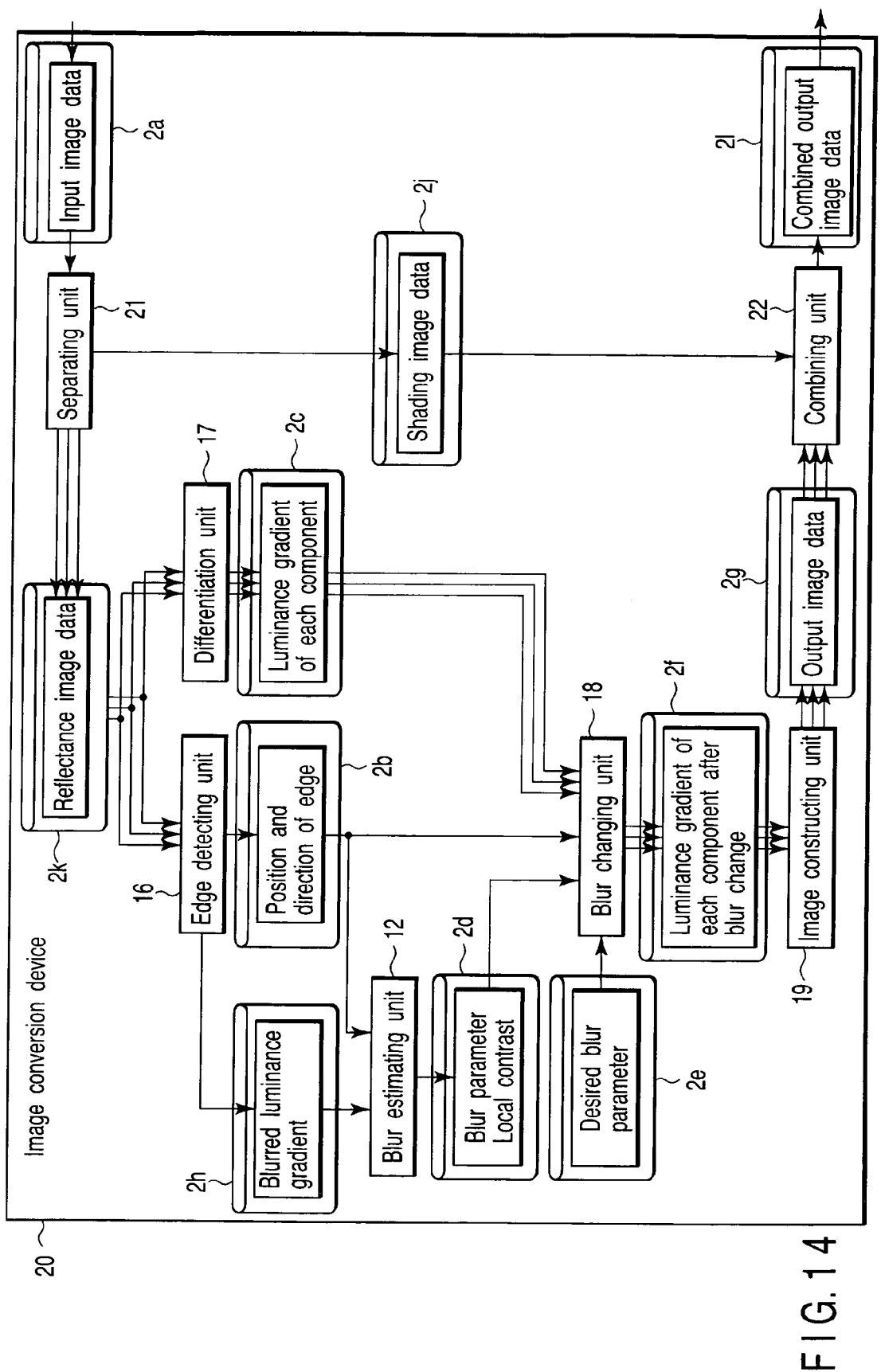
FIG. 14 is a block diagram showing an example of the arrangement of an image conversion device according to the sixth embodiment.

FIG. 14 is a block diagram showing an example of the arrangement of the image conversion device according to this embodiment.

An image conversion device 20 according to this embodiment comprises storage devices 2j to 2l, a separating unit 21, and a combining unit 22.

The separating unit 21 reads each component $I_j$ contained in the input image data stored in the storage device 2a. The separating unit 21 separates each component $I_j$ into shading image data S and reflectance image data $R_j$ on the basis of the relationship represented by equation (28). The separating unit 21 then stores the reflectance image data $R_j$ in the storage device 2k, and stores the shading image data S in the storage device 2j, where j is a component number.

$$I_j(x,y) = S(x,y) R_j(x,y) \quad (28)$$

Shading image data is the data of an element which changes depending on the illumination conditions for a scene. Shading image data represents an effect of making the brightness of an object look different depending on the incident angle of light or the shade formed when light is blocked by an object. Reflectance image data obtained by removing shading image data from input image data corresponds to "color" unique to a substance. One of various known techniques can be used as this separation method.

This embodiment performs blur estimation, blur change, and image construction for reflectance image data like the fifth embodiment.

The combining unit 22 forms output image data $I'_j$ by multiplying and combined output image data $R'_j$ stored in the storage device 2g by an image constructing unit 19 and the shading image data S stored in the storage device 2j on the basis of the relationship represented by equation (29). The combining unit 22 then stores the output image data $I'_j$ in the storage device 2l.

$$I'_j(x,y)=S(x,y)R'_j(x,y) \quad (29)$$

The image conversion device 20 according to this embodiment described above comprises the separating unit 21 and the combining unit 22. The separating unit 21 separates input image data into shading image data and reflectance image data. The image conversion device 20 applies the image conversion technique according to the fifth embodiment to the reflectance image data. The combining unit 22 combines the output image data and the shading image data to form output image data after combining operation.

This embodiment described above can increase the accuracy of blur estimation by removing a change in luminance due to an illumination condition from input image data. The embodiment can prevent a gradual change in luminance observed on a curved object surface or a half-shade border from being mistaken for large blur.

In each embodiment described above, the arrangement of the respective constituent elements may be changed as long as similar operation can be implemented, the respective constituent elements may be arbitrarily combined. The respective constituent elements may be arbitrarily divided, or several constituent elements may be omitted. That is, each embodiment described above is not limited to the above arrangement, and constituent elements can be modified and embodied at the execution stage within the spirit and scope of the invention. For example, the respective storage devices can be arbitrarily combined.

Each processing unit in the image conversion devices 1, 8, 10, 13, 15, and 20 according to the respective embodiments may be implemented by, for example, a processor controlled by a program. A program for making a processor function as each processing unit in the image conversion devices 1, 8, 10, 13, 15, and 20 according to the respective embodiments can be written in a storage medium such as a magnetic disk (e.g., a flexible disk or hard disk), an optical disk (e.g., a CD-ROM or DVD), or a semiconductor memory and can be applied to a computer having a processor. In addition, programs can be applied to a computer by being transmitted through a communication medium. The computer loads programs, and the operation of the computer is controlled by the programs, thereby implementing the functions of the image conversion devices 1, 8, 10, 13, 15, and 20. The programs may be distributed and installed in a plurality of computers, and the computers may execute processing in cooperation with each other.

Seventh Embodiment

This embodiment will exemplify application examples of blur change described in the first to sixth embodiments.

According to the first application example, blur conversion can be applied to image retouch software or digital camera accessory software. Likewise, blur conversion can be applied to hardware which supports image retouch software or digital camera accessory software.

The user can use blur conversion for the correction/edition of photographic data captured by himself/herself. More specifically, the user can use blur conversion when he/she wants to correct an out-of-focus image. The user can use blur conversion, in particular, when he/she wants to shift a focal position while keeping the depth of focus unchanged without making the entire photographic data sharp because the photographic data is intentionally captured with shallow depth of focus.

The user can use blur conversion for the correction/edition of merchandise image data published on the Web or a magazine. Assume that after the user selects favorite photographic data from several photographic data and performs various processes for the publication on the Web or a magazine, he/she wants to correct the manner of blurring in the selected photographic data in consideration of balance. Even in such a case, the user can correct the blur state by executing blur conversion for the data under process instead of redoing the processes from the selection of photographic data.

The user can use blur conversion when he/she wants to locally add blur to a poster image, an advertisement image, or the like to express the sense of speed.

Assume that although the user has succeeded in taking a picture of a dynamic object such as a person or animal at a precious moment, he/she wants to partially correct blur. In this case, the user can correct the precious picture which has already been captured instead of shooting a picture again upon changing camera settings.

Assume that a shadow in a portrait is made excessively clear due to, for example, an error in illumination conditions at the time of shooting, and the portrait is not suitable for its purpose. In this case, this shadow can be blurred into a softer focus state.

Even using one photograph which exists singly, such as a photograph of a historical figure, allows to generate photographs or the like with different settings.

According to the second application example, blur conversion can be applied to implement, in a software manner, a state set when the user takes a picture upon changing camera settings. For example, blur conversion can be applied to a digital camera LS1 or control software for a digital camera LS1.

Assume that the cost of a digital camera is decreased by slightly decreasing its autofocus accuracy. In this case, when a given picture is slightly out of focus because of the decrease in autofocus accuracy, the blur can be adjusted by blur conversion.

Even if a digital camera has a fixed lens, blur conversion makes it possible to obtain an effect like that obtained by interchanging lenses.

In addition, camera parameters can be changed without any limitations from the mechanism of the camera. If, for example, the depth of focus is changed by mechanically changing the aperture of the camera, the amount of light changes. If the amount of light is compensated for by a shutter speed, movement blur is added. However, performing blur conversion makes it possible to change the depth of focus without changing the aperture or shutter speed.

According to the third application example, blur conversion can be used for a game machine LSI or software operating on a game machine LSI.

Assume that the user wants to obtain an effect of shifting the focus from a given object to another object in a scene of an actually shot image material. In this case, the user can obtain an effect of shifting the focus by moving the position of blur in one image by blur conversion instead of playing back a moving image with such focus shift. This makes it possible to reduce the data length.

A simple CG image is sharp as a whole and hence exhibits a strong sense of artificiality. However, blurring the CG image (adding focal blur and movement blur) by applying blur conversion to the image makes it possible to make the image natural.

What is claimed is:

1. An image conversion device comprising:
a blur estimating unit which estimates a blur state of input image data;
a blur changing unit which changes the blur state estimated by the blur estimating unit into an arbitrary blur state;
an image constructing unit which constructs output image data on the basis of a blur changing result obtained by the blur changing unit,
a separating unit which separates the input image data into shading image data and reflectance image data, and
a combining unit which generates output image data after combining on the basis of the output image data and the shading image data, and
in which the blur estimating unit estimates a blur state of the reflectance image data, and
the blur changing unit changes a blur state of the reflectance image data into an arbitrary blur state.

2. An image conversion device comprising:
a blur estimating unit which estimates a blur state of input image data;
a blur changing unit which changes the blur state estimated by the blur estimating unit into an arbitrary blur state;
an image constructing unit which constructs output image data on the basis of a blur changing result obtained by the blur changing unit,
an edge detecting unit which detects a position of an edge point and a direction of an edge of the input image data, and
a differentiation unit which calculates a luminance gradient of the input image data by differentiating the input image data, and
in which the blur estimating unit estimates an estimated blur parameter and a local contrast of the edge included in a blur function representing the blur state, for the edge point detected by the edge detecting unit, on the basis of the input image data and the direction of the edge,
the blur changing unit generates a luminance gradient for the edge point after blur change of changing the estimated blur parameter into a desired blur parameter, on the basis of the luminance gradient, the direction, and the local contrast, and
the image constructing unit constructs the output image data on the basis of the luminance gradient after the blur change.

3. An image conversion device comprising:
a blur estimating unit which estimates a blur state of input image data;
a blur changing unit which changes the blur state estimated by the blur estimating unit into an arbitrary blur state;
an image constructing unit which constructs output image data on the basis of a blur changing result obtained by the blur changing unit,
an edge detecting unit which detects a position of an edge point and a direction of an edge of the input image data, and calculates a blurred luminance gradient of the input image data, and
a differentiating unit which calculates a luminance gradient of the input image data by differentiating the input image data, and
in which the blur estimating unit obtains a blur parameter for the blurred input image data which is included in a blur function representing the blur state, for the edge point detected by the edge detecting unit, on the basis of the direction and the blurred luminance gradient of the input image data, obtains an estimated blur parameter for the input image from the blur parameter, and estimates a local contrast of the edge,
the blur changing unit generates a luminance gradient after blur change of changing the estimated blur parameter into a desired blur parameter for the edge point, on the basis of the luminance gradient of the input image data, the direction, and the local contrast, and
the image constructing unit constructs the output image data on the basis of the luminance gradient after the blur change.

4. The device according to claim 3, wherein
the input image data is color image data comprising a plurality of components,
the edge detecting unit calculates a blurred luminance gradient for each of said plurality of components, and obtains the blurred luminance gradient of the input image data on the basis of the blurred luminance gradients of said plurality of components,
the differentiating unit calculates luminance gradients of said plurality of components,
the blur changing unit generates a luminance gradient after blur change for each of said plurality of components, which converts the estimated blur parameter into a desired blur parameter, for the edge point, on the basis of the luminance gradients, the direction, and the local contrast of said plurality of components, and
the image constructing unit constructs the output image data comprising image construction data for each of said plurality of components, on the basis of the luminance gradient after blur change for each of said plurality of components.

* * * * *